(12) United States Patent
Lee

(10) Patent No.: US 11,691,481 B2
(45) Date of Patent: Jul. 4, 2023

(54) MAINTENANCE WINDOW STRUCTURE FOR LARGE VEHICLE

(71) Applicants: HYUNDAI MOTOR COMPANY, Seoul (KR); KIA MOTORS CORPORATION, Seoul (KR)

(72) Inventor: Hanjong Lee, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 194 days.

(21) Appl. No.: 17/192,343

(22) Filed: Mar. 4, 2021

(65) Prior Publication Data

US 2022/0032742 A1 Feb. 3, 2022

(30) Foreign Application Priority Data

Jul. 28, 2020 (KR) .......................... 10-2020-0093490

(51) Int. Cl.
| | |
|---|---|
| *B60J 1/00* | (2006.01) |
| *B62D 31/02* | (2006.01) |
| *B62D 25/24* | (2006.01) |
| *B60S 5/00* | (2006.01) |
| *B60J 5/04* | (2006.01) |
| *B62D 31/04* | (2006.01) |

(52) U.S. Cl.
CPC .............. *B60J 1/006* (2013.01); *B60J 1/007* (2013.01); *B60J 5/0491* (2013.01); *B60S 5/00* (2013.01); *B60Y 2200/143* (2013.01); *B60Y 2304/074* (2013.01); *B62D 25/24* (2013.01); *B62D 31/02* (2013.01); *B62D 31/04* (2013.01)

(58) Field of Classification Search
CPC .......... B60J 1/006; B60J 1/007; B60J 5/0491; B62D 25/24; B62D 31/02; B62D 31/04; B60S 5/00; B60Y 2200/143; B60Y 2304/074
USPC ...................... 296/146.1, 96.21, 146.2, 84.1
See application file for complete search history.

(56) References Cited

U.S. PATENT DOCUMENTS

| | | | |
|---|---|---|---|
| 6,513,863 B1 * | 2/2003 | Renke ..................... | B60P 3/423 296/57.1 |
| 7,673,924 B1 * | 3/2010 | Lau .......................... | B60J 11/08 296/95.1 |
| 10,254,088 B1 * | 4/2019 | Luster ..................... | B60J 1/006 |

* cited by examiner

*Primary Examiner* — Joseph D. Pape
*Assistant Examiner* — Dana D Ivey
(74) *Attorney, Agent, or Firm* — Lempia Summerfield Katz LLC

(57) ABSTRACT

A maintenance window structure, for a large vehicle configured in a chassis frame that accommodates driving components of a large vehicle, includes: at least one main opening configured to communicate with a receiving space of the chassis frame and formed on a window frame; the window frame mounted on the chassis frame; a pillar frame detachably provided on the window frame and configured to partition the at least one main opening into a plurality of inspection openings, and an inspection cover that is configured to engage with the window frame and the pillar frame and to cover the plurality of inspection openings.

18 Claims, 9 Drawing Sheets

MAINTENANCE WINDOW STRUCTURE FOR LARGE VEHICLE

CROSS-REFERENCE TO RELATED APPLICATION

This application claims priority to and the benefit of Korean Patent Application No. 10-2020-0093490, filed on Jul. 28, 2020, the entire contents of which are incorporated herein by reference.

FIELD

The present disclosure relates to a vehicle body of a large vehicle.

BACKGROUND

The statements in this section merely provide background information related to the present disclosure and may not constitute prior art.

In general, large commercial vehicles, particularly large vehicles, are one of the means of transport capable of transporting a large number of personnel. Recently, a double-decker bus has been applied to increase the number of passengers in large vehicles, for example, large buses. Furthermore, environment-friendly double-decker buses, such as a double-decker electric bus and a double-decker hydrogen bus, are being applied, taking into account the atmospheric environment and the increase of passengers.

In such a large vehicle, a maintenance window frame for inspection and maintenance of vehicle driving components is configured on the front side of the vehicle body. A general maintenance window frame combines a pillar frame that divides the opening of the window frame into a plurality of the window frames. The pillar frame is fixed to the window frame by welding.

Furthermore, in the window frame described above, an inspection cover covering the opening is mounted on the inner edge of the opening partitioned by the pillar frame. This inspection cover is mounted on a mounting flange provided at the inner edge of the opening.

The worker separates the inspection cover from the mounting flange in order to check and maintain the components disposed on the interior side of the maintenance window frame as above. Therefore, the size of the opening partitioned by the pillar frame is limited to the size that the worker can pick.

Therefore, in the related art, it is difficult to secure an opening size for inspection and maintenance of components in response to a layout change or design modification of components due to an increase in the number of components and the like.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a maintenance window structure for a large vehicle that can reduce the limitation of the size of an opening area for inspecting and maintaining components in a simple configuration.

A maintenance window structure for a large vehicle according to one form of the present disclosure may be configured in a chassis frame that accommodates driving components of a large vehicle. The maintenance window structure may include a window frame of which at least one main opening configured to communicate with a receiving space of the chassis frame is formed thereon and the window frame mounted on the chassis frame, a pillar frame detachably provided on the window frame and configured to partition the at least one main opening into a plurality of inspection openings, and an inspection cover that is configured to engage with the window frame and the pillar frame and to cover the inspection opening.

The pillar frame may be engaged with the window frame and the inspection cover through a mounting bracket.

The maintenance window structure according to one form of the present disclosure may include: at least one main opening configured to communicate with a receiving space of the chassis frame and formed on a window frame; the window frame mounted on the chassis frame; a pillar frame disposed in the at least one main opening of the window frame in up and down directions and configured to partition the at least one main opening into a plurality of inspection openings; and a first and a second cover mounting brackets fixed to the upper and lower portions of the pillar frame, respectively, and configured to engage with an inspection cover.

The maintenance window structure may further include a pillar mounting bracket that is fixed to the window frame and engaged with the cover mounting bracket.

The pillar frame is detachably provided to the pillar mounting bracket through the cover mounting bracket.

The cover mounting bracket may include a first mounting portion configured to engage with the pillar mounting bracket, a flange portion that is bent, extended from the first mounting portion and configured to support the edge of the inspection cover, and a second mounting portion connected to the first mounting portion and configured to engage with the inner edge of the inspection cover.

In the first mounting portion, a slit-shaped first bolt connection hole that is joined with the pillar mounting bracket through a first mounting bolt may be formed.

The pillar mounting bracket may include a third mounting portion configured to engage with the first mounting portion through a first mounting bolt.

In the third mounting portion, a pillar mounting bracket engage hole into which the first mounting bolt is inserted may be formed and a pillar mounting bracket weld nut that is configured to engage with the first mounting bolt may be fitted around the pillar mounting bracket engage hole.

The flange portion may include a first portion configured to support the upper and lower portions of the pillar frame, and a second portion that is curved from the first portion and configured to support the inner surface of the window frame.

The second mounting portion may include a support member disposed at a predetermined distance from the first mounting portion and configured to support the edge of the inspection cover.

The support member may include a bent portion connected to the first mounting portion.

A support engage hole into which a second mounting bolt is inserted may be formed in the support member, and a support weld nut that engages with the second mounting bolt to secure the inspection cover may be fitted around the support engage hole.

A second bolt connection hole may be formed in the first mounting portion to engage the second mounting bolt inserted into the support engage hole.

The pillar frame may include a first support bracket that is fixed on both sides of the pillar frame and is configured to support the cover mounting bracket and the edge of the inspection cover.

The window frame may include a second support bracket that is fixed to the inner surface of the window frame and is configured to support the cover mounting bracket and the edge of the inspection cover.

The cover mounting bracket may include a bracket support portion configured to support the inside edge of the inspection cover.

The window frame may include an upper member, a lower member, a center member and both side members, and the main openings may be divided by the center member.

The window frame may include a cover mounting portion provided at the edge of each main opening and engages the edge of the inspection cover.

In the exemplary embodiment of the present disclosure, it is possible to easily provide an opening size for inspection and maintenance of driving components, thereby reducing cost loss such as investment and development costs due to a change in the maintenance window structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 9:
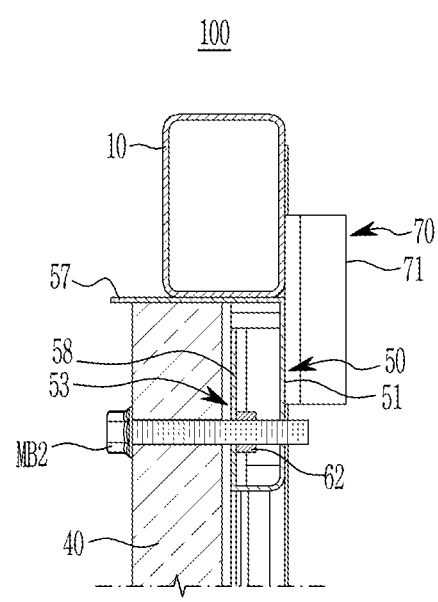

FIG. 5 to FIG. 8 are drawings showing a cover mounting bracket and a pillar mounting bracket applied to a maintenance window structure for a large vehicle according to one form of the present disclosure; and FIG. 9 is a cross-sectional view showing a combination of a cover mounting bracket, a pillar mounting bracket and an inspection cover applied to a maintenance window structure for a large vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to clearly describe the present disclosure, parts irrelevant to the description are omitted.

Since the size and thickness of each component shown in the drawings are arbitrarily shown for convenience of description, the present disclosure is not necessarily limited to those shown in the drawings, and the thickness is enlarged to clearly express various parts and regions.

In addition, in the following detailed description, the names of the configurations are divided into first, second, etc. to distinguish the configurations in the same relationship, and are not necessarily limited to the order in the following description.

Throughout the specification, when a part includes a certain component, it means that other components may be further included rather than excluding other components unless specifically stated to the contrary.

In addition, terms such as . . . part, . . . means, etc. described in the specification mean a unit of a comprehensive structure that performs at least one function or operation.

Figure 1:
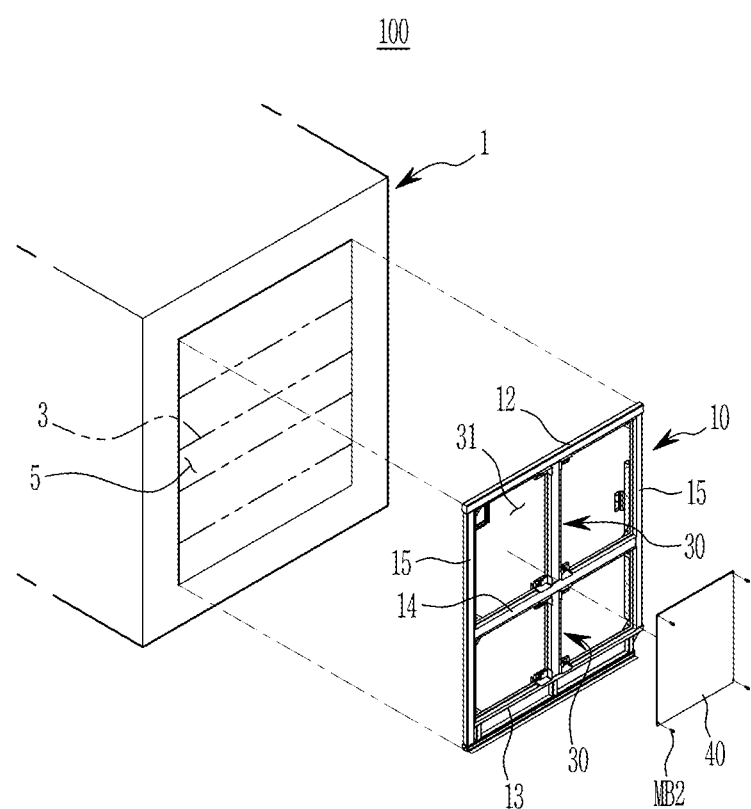
FIG. 1 is an exploded perspective view showing a maintenance window structure for a large vehicle according to one form of the present disclosure.
Figure 2:
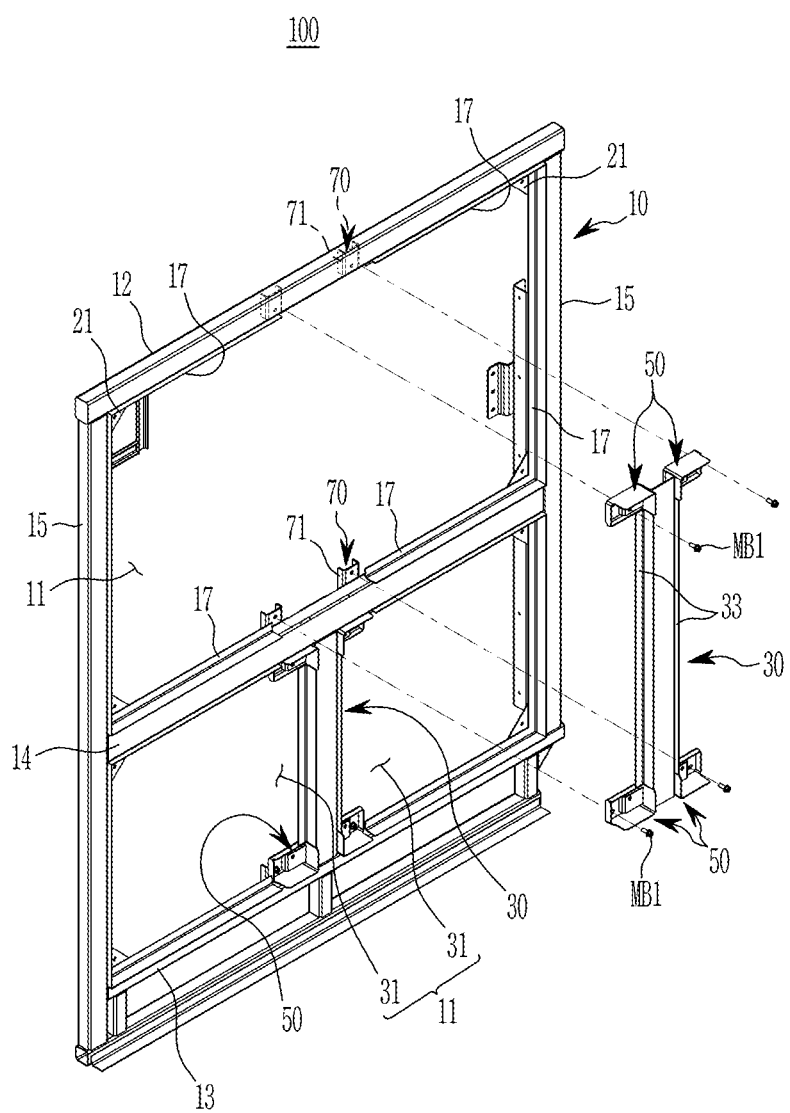
FIG. 2 is a partial exploded perspective view showing a maintenance window structure for a large vehicle according to one form of the present disclosure.

FIG. 1 is an exploded perspective view showing a maintenance window structure for a large vehicle according to one form of the present disclosure, and FIG. 2 is a partial exploded perspective view showing a maintenance window structure for a large vehicle according to one form of the present disclosure.

Referring to FIG. 1 and FIG. 2, a maintenance window structure 100 for a large vehicle according to one form of the present disclosure may be applied to a chassis frame 1 of a large vehicle such as an ultra-low-floor bus and a double-decker electric bus.

Furthermore, the above-described large vehicle may include a general urban bus such as an electric bus or a hydrogen bus, an express bus, an articulated bus, and a double-decker hydrogen bus.

The chassis frame 1 forms a receiving space 5 as a component room accommodating various driving components 3 for driving a vehicle. Since the configuration of the chassis frame 1 for a large vehicle is a known technology widely known in the art, a more detailed description of the configuration will be omitted in this specification.

The chassis frame 1 may include accessory elements such as various brackets, blocks, plates, housings, covers, colors, etc. for mounting constituent elements to be described below.

However, since the accessory elements are for installing each constituent element to the chassis frame 1, in one form of the present disclosure, the above-described accessory elements are collectively referred to as chassis frame 1 except for exceptional cases.

A maintenance window structure 100 according to one form of the present disclosure is configured in the chassis frame 1, and has a structure capable of opening and closing the receiving space 5 of the chassis frame 1 through a predetermined opening area for inspection and maintenance of driving components 3.

In the industry, the vehicle width direction is called L direction, the front and rear direction of the vehicle body is called the T direction, and the height direction of the vehicle body is called H direction. However, in one form of the present disclosure, instead of setting the LTH direction as described above as the reference direction, the constituent elements will be described below by setting the front and rear directions, both directions (left and right directions) and up and down directions.

Furthermore, the stage in the following may be defined as either end, or may be defined as a certain portion including the end.

The maintenance window structure 100 for a large vehicle according to one form of the present disclosure has a structure capable of reducing the size of an opening area for checking and maintaining driving components 3 accommodated in receiving space 5 of chassis frame 1.

In addition, one form of the present disclosure provides a maintenance window structure 100 for a large vehicle that can commonly use the inspection cover even when the layout of driving components 3 is changed.

For this, the maintenance window structure 100 for a large vehicle according to one form of the present disclosure may basically include a window frame 10, a pillar frame 30, an inspection cover 40, a cover mounting bracket 50, and a pillar mounting bracket 70.

In one form of the present disclosure, the window frame 10 is an outer frame mounted on the chassis frame 1, and is provided in a rectangular frame shape. The window frame 10 forms at least one main opening 11 communicated with the receiving space 5 of chassis frame 1.

The window frame 10 may include an upper member 12, a lower member 13, a center member 14, and both side members 15 as an example.

The upper member 12, lower member 13 and center member 14 are disposed along the left and right directions, and the side members 15 may connect both ends of the upper member 12, the lower member 13 and the center member 14 in up and down directions.

In this window frame 10, the main opening 11 is formed on the upper and lower sides by the center member 14, respectively.

In one form of the present disclosure, the pillar frame 30 divides the main opening 11 of the window frame 10 into a plurality of inspection openings 31, and the inspection openings 31 are formed in the up and down directions from the center side of the main opening 11.

The pillar frame 30 is disposed on the center side of the main opening 11, which is divided up and down in the window frame 10. The pillar frame 30 is a center pillar member of approximately "L" cross-section shape, and is provided to be detachable (removable and mount) to the window frame 10.

The inspection cover 40 covers the inspection opening 31 partitioned by pillar frame 30 in the window frame 10, and is provided in the form of a rectangular plate. The inspection cover 40 is engaged with window frame 10 and pillar frame 30 in the inspection opening 31 area.

The inspection cover 40 is supported by the window frame 10 and pillar frame 30 inside the inspection opening 31 and can be engaged with the window frame 10 and the pillar frame 30.

Figure 3:
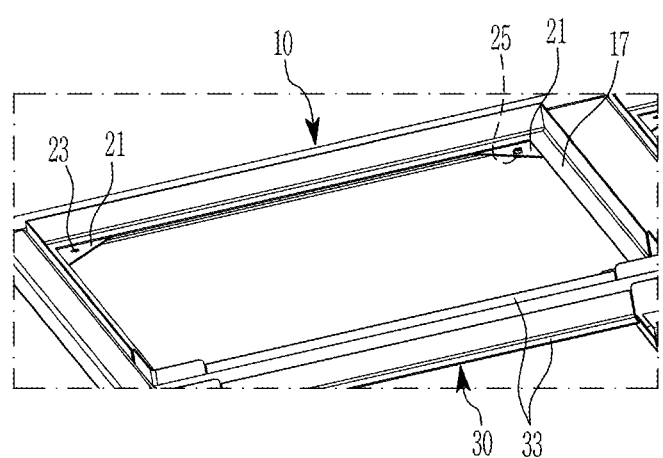
FIG. 3 and FIG. 4 are drawings showing an inspection cover support structure of a window frame and a pillar frame applied to a maintenance window structure for a large vehicle according to one form of the present disclosure.

As shown in FIG. 3, the pillar frame 30 contains a first support bracket 33 that is fixed on both upper and lower sides. The first support bracket 33 is provided in about "L" cross-section shape. The first support bracket 33 supports the cover mounting bracket 50, which will be described further later, and supports one edge of the inspection cover 40.

Figure 4:
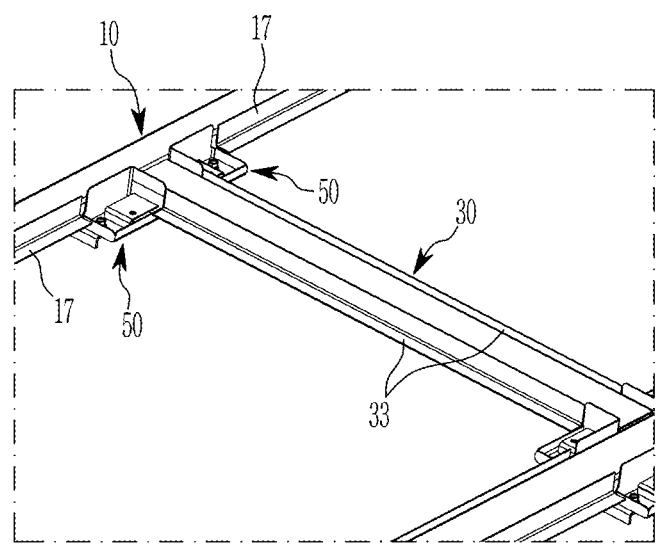
Figure 5:
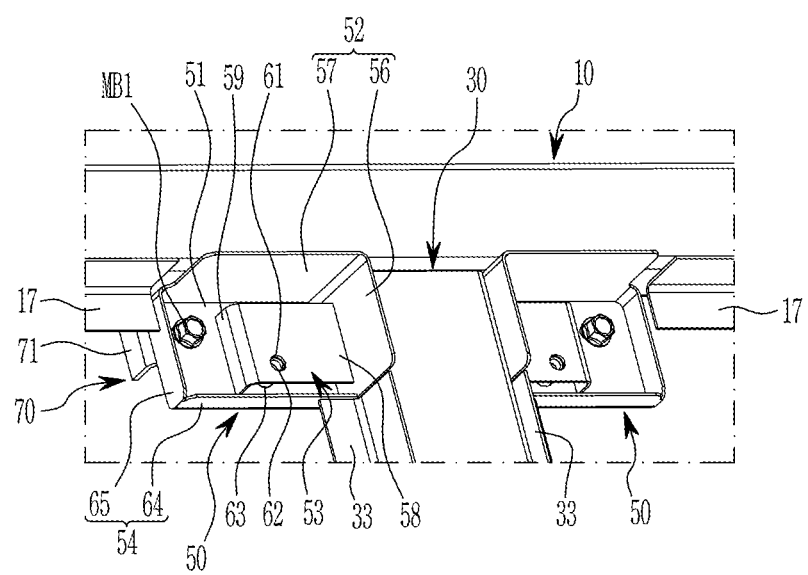
Figure 6:
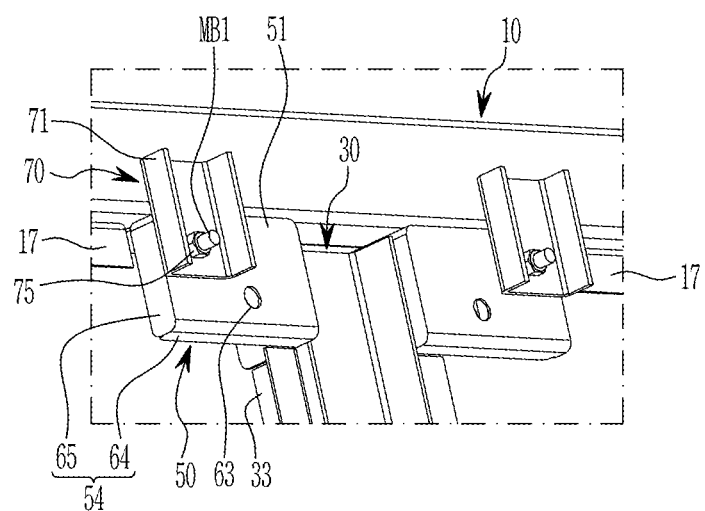
Figure 7:
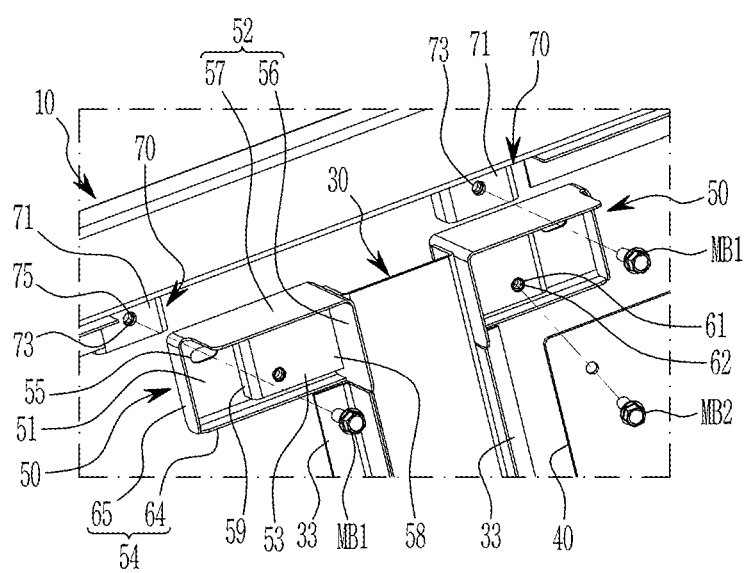
Figure 8:
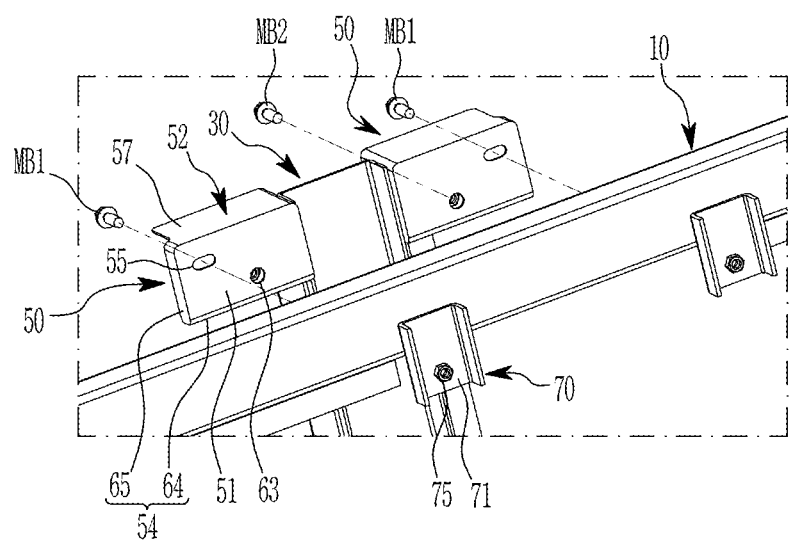

As shown in FIG. 4, the window frame 10 includes a second support bracket 17 in the form of a "L" cross-section and fixed to the inner surface of the window frame 10. The second support bracket 17 supports the cover mounting bracket 50, which will be explained further later, and the remaining edge of the inspection cover 40.

The window frame 10 further includes a cover mounting portion 21 provided at a corner portion of each main opening 11. The cover mounting portion 21 is a portion engaged with one upper and lower corners of the inspection cover 40, and includes a cover mounting portion engage hole 23 and a cover mounting portion weld nut 25 connected around the cover mounting portion engage hole 23.

The pillar frame 30 can be engaged with the window frame 10 through the cover mounting bracket 50 and the pillar mounting bracket 70, which will be described further later, and with the inspection cover 40.

The pillar frame 30 can be engaged to the window frame 10 via a first mounting bolt MB1 and the pillar mounting bracket 70. The inspection cover 40 can be engaged to the pillar frame 30 via a second mounting bolt MB2 and the cover mounting bracket 50.

One upper and lower corners of the inspection cover 40 can be engaged with the cover mounting portion 21 through the second mounting bolt MB2. The second mounting bolt MB2 penetrates the edge of the inspection cover 40, and can be engaged in the cover mounting portion weld nut 25 through the cover mounting portion engage hole 23.

The pillar frame 30 described above may be mounted on or removed from the window frame 10 through the first mounting bolt MB1 and the pillar mounting bracket 70. The pillar frame 30 may be detachably provided to the pillar mounting bracket 70 through the cover mounting bracket 50.

Hereinafter, the configuration of the cover mounting bracket 50 and the pillar mounting bracket 70 as described above will be described in detail with reference to the accompanying drawing.

The cover mounting bracket 50 is for mounting the inspection cover 40 to the pillar frame 30. The cover mounting bracket 50 is fixed to both upper and lower sides of pillar frame 30, respectively, and can be engaged with the inspection cover 40.

FIG. 5 to FIG. 8 are drawings showing a cover mounting bracket and a pillar mounting bracket applied to a maintenance window structure for a large vehicle according to one form of the present disclosure, and FIG. 9 is a cross-sectional view showing a combination of a cover mounting bracket, a pillar mounting bracket and an inspection cover applied to a maintenance window structure for a large vehicle according to one form of the present disclosure.

Referring to FIG. 5 to FIG. 9, the cover mounting bracket 50 includes a first mounting portion 51, a flange portion 52, a second mounting portion 53, and a bracket support portion 54.

The first mounting portion 51 is engaged with the pillar mounting bracket 70, and forms a bottom surface opened to the front side. In the first mounting portion 51, a first bolt connection hole 55 that can be combined with the first mounting bolt MB1 is formed. The first bolt connection hole 55 may be formed in a slit shape along the left and right directions to absorb the assemble tolerance of the first mounting portion 51 and the pillar mounting bracket 70.

The flange portion 52 supports the edge of the inspection cover 40 on the pillar frame 30 side, and may be integrally formed on the first mounting portion 51.

The flange portion 52 may include a first portion 56 and a second portion 57. The first portion 56 is fixed to both upper and lower sides of pillar frame 30. The second portion 57 may be integrally connected to the first portion 56, and supports the inner side of the window frame 10. These first and second portions 56, and 57 are provided in an approximately "L" cross-section shape.

The second mounting portion 53 is engaged with the edge portion of the inspection cover 40 through the second mounting bolt MB2, and can be connected to the first mounting portion 51.

The second mounting portion 53 supports the edge of the inspection cover 40 and sets the assemble position of the inspection cover 40. The second mounting portion 53 includes a support member 58 connected to the first mounting portion 51 at a predetermined interval. The support member 58 is provided in an approximately "L" cross-section shape, and includes a bent portion 59 that may be integrally connected to the first mounting portion 51.

The second mounting portion 53 includes a support engage hole 61 formed in the support member 58, and a support weld nut 62 coupled around the support engage hole 61. The second mounting bolt MB2 is inserted into the support engage hole 61. The support weld nut 62 is fixed to the support member 58 by welding.

The second mounting bolt MB2 penetrates the edge of the inspection cover 40 and is inserted into the support engage hole 61, and is engaged with the support weld nut 62, which is connected near the support engage hole 61. In the first mounting portion 51, a second bolt connection hole 63 into which the second mounting bolt MB2 is inserted is formed.

The bracket support portion 54 is a part that supports the inner edge of the inspection cover 40.

The bracket support portion 54 is provided in the form of a wall bent from the edge side to the front side of the first mounting portion 51. The bracket support portion 54 includes a first bracket supporting wall 64 supporting the end of the first support bracket 33, and a second bracket supporting wall 65 bent from the first bracket supporting wall 64 to support the end of the second support bracket 17.

Referring to FIG. 1 and FIG. 2, the pillar mounting bracket 70 is for engaging pillar frame 30 to the window frame 10 through the cover mounting bracket 50.

The pillar mounting bracket 70 corresponding to the cover mounting bracket 50 is provided and is fixed to the window frame 10, and is engaged with the cover mounting bracket 50 through the first mounting bolt MB1.

The pillar mounting bracket 70 includes a third mounting portion 71 that is engaged with the first mounting portion 51 through the first mounting bolt MB1.

The third mounting portion 71 includes a pillar mounting bracket engage hole 73 that is engaged with the first mounting bolt MB1, and a pillar mounting bracket weld nut 75 that is engaged in the vicinity of the pillar mounting bracket engage hole 73.

The first mounting bolt MB1 coupled to the first bolt connection hole 55 of the first mounting portion 51 is engaged with the pillar mounting bracket weld nut 75 through the pillar mounting bracket engage hole 73 of the third mounting portion 71.

Hereinafter, the assemble process and operation of the maintenance window structure 100 for a large vehicle according to one form of the present disclosure configured as described above will be described in detail with reference to the drawings.

The pillar frame 30 is disposed in the up and down directions inside the main opening 11 of the window frame 10. Here, the cover mounting brackets 50 are fixed to both upper and lower sides of the pillar frame 30 through the first portion 56 of the flange portion 52, respectively.

In the cover mounting bracket 50, the second portion 57 of the flange portion 52 supports the inner surface of the window frame 10. And, the bracket support portion 54 supports the ends of the first support bracket 33 of the pillar frame 30 and the second support bracket 17 of the window frame 10, respectively.

After that, the first mounting portion 51 of a the cover mounting bracket 50 is matched to the third mounting portion 71 of the pillar mounting bracket 70, and the first bolt connection hole 55 of the first mounting portion 51 and the pillar mounting bracket engage hole 73 of the third mounting portion 71 are matched.

Then, insert the first mounting bolt MB1 into the first bolt connection hole 55 and the pillar mounting bracket engage hole 73 to be engaged with the pillar mounting bracket weld nut 75 of the third mounting portion 71.

Thus, the pillar frame 30 can be engaged (mounted) to the pillar mounting bracket 70 of the window frame 10 through the cover mounting bracket 50. Thus, the main opening 11 of the window frame 10 may be divided into a plurality of inspection openings 31 through the pillar frame 30.

In the state where the pillar frame 30 is substantially mounted on the window frame 10, the inspection cover 40 is mounted on the inner edge of the inspection opening 31.

Then, the edge of inspection cover 40 is positioned on the first support bracket 33 of pillar frame 30 and the second support bracket 17 of the window frame 10. At this time, the first support bracket 33 supports one edge of the inspection cover 40, and the second support bracket 17 supports the other edge of the inspection cover 40.

Here, the cover mounting portion 21 of the window frame 10 supports one upper and lower corners of the inspection cover 40. And, the flange portion 52 of the cover mounting bracket 50 supports the other upper and lower edges of the inspection cover 40, and the second mounting portion 53 supports the inner edge of the inspection cover 40.

The engage holes provided in one upper and lower corners of the inspection cover 40 are matched to the cover mounting portion engage hole 23 of the cover mounting portion 21. The engage holes provided in the other upper and lower corners of the inspection cover 40 is matched to the support engage holes 61 of the second mounting portion 53.

Then, the second mounting bolt MB2 is inserted into the cover mounting portion engage hole 23 of the cover mounting portion 21 through the inspection cover 40, and engaged the cover mounting portion weld nut 25 of the cover mounting portion 21.

Then, the second mounting bolt MB2 is connected to the support engage hole 61 of the second mounting portion 53 through the inspection cover 40, and is engaged with the support weld nut 62 of the second mounting portion 53. The end of the second mounting bolt MB2 in the second mounting portion 53 is coupled to the second bolt connection hole 63 of the first mounting portion 51.

Therefore, the inspection cover 40 is mounted to the cover mounting portion 21 of the window frame 10 and the second mounting portion 53 of the cover mounting bracket 50 through the second mounting bolt MB2, and the inspection opening 31 can be closed by the inspection cover 40.

On the other hand, in the state in which the inspection cover 40 is assembled as described above, in the case of inspection and maintenance of the driving components 3, the series of processes as described above are performed in reverse order. And then the inspection cover 40 may be removed from the cover mounting portion 21 and the second mounting portion 53 of the cover mounting bracket 50.

On the other hand, when the layout of the driving components 3 is changed, etc., due to the size limitation of the inspection opening 31 as described above, inspection and maintenance of the driving components 3 may not be performed smoothly.

In this case, with the inspection cover 40 separated from the cover mounting portion 21 of the window frame 10 and the second mounting portion 53 of the cover mounting bracket 50, the cover mounting bracket 50 is separated from the pillar mounting bracket 70. Then, the pillar frame 30 can be removed substantially from the window frame 10.

Thus, in one form of the present disclosure, as the pillar frame 30 is removed from the window frame 10 as described above, it is possible to easily inspect and maintain the driving components 3 through the main opening 11 of the window frame 10.

According to the maintenance window structure 100 for a large vehicle according to the present disclosure as described so far, by providing the removable structure of the pillar frame 30 by the cover mounting bracket 50 and the pillar mounting bracket 70, it is possible to reduce the restriction on the size of the opening area for checking and servicing driving components 3 accommodated in the receiving space 5 of the chassis frame 1.

Therefore, even if a layout change or design modification of driving components 3 occurs, an opening size for inspection and maintenance of driving components 3 can be easily secured. Thus, cost losses such as investment and development can be reduced.

Furthermore, in one form of the present disclosure, since the inspection cover 40 can be used in common even when the layout of driving components 3 is changed, cost reduction and improvement of marketability for inspection and maintenance of driving components 3 can be achieved.

While this disclosure has been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

| <Description of symbols> | |
|---|---|
| 1: chassis frame | 3: driving component |
| 5: receiving space | 10: window frame |
| 11: main opening | 12: upper member |
| 13: lower member | 14: center member |
| 15: side member | 17: second support bracket |
| 21: cover mounting portion | |
| 23: cover mounting portion engage hole | |
| 25: mounting portion weld nut | 30: pillar frame |
| 31: inspection opening | 33: first support bracket |
| 40: inspection cover | 50: cover mounting bracket |
| 51: first mounting portion | 52: flange portion |
| 53: second mounting portion | 54: bracket support portion |
| 55: first bolt connection hole | 56: first portion |
| 57: second portion | 58: support member |
| 59: bent portion | 61: support engage hole |
| 62: support weld nut | 63: second bolt connection hole |
| 64: first bracket supporting wall | 65: second bracket supporting wall |
| 70: pillar mounting bracket | 71: third mounting portion |
| 73: pillar mounting bracket engage hole | |
| 75: pillar mounting bracket weld nut | |
| MB1: first mounting bolt | MB2: second mounting bolt |
| 100: maintenance window structure | |

What is claimed is:

1. A maintenance window structure for a large vehicle configured in a chassis frame that accommodates driving components of the large vehicle, the maintenance window structure comprising:
at least one main opening configured to communicate with a receiving space of the chassis frame and formed on a window frame mounted on the chassis frame;
a pillar frame detachably formed on the window frame and configured to partition the at least one main opening into a plurality of inspection openings; and
an inspection cover that is configured to engage with the window frame and the pillar frame and to cover the plurality of inspection openings,
wherein the pillar frame is configured to engage with the window frame and the inspection cover through a mounting bracket.

2. A maintenance window structure for a large vehicle configured in a chassis frame that accommodates driving components of the large vehicle, the maintenance window structure comprising:
at least one main opening configured to communicate with a receiving space of the chassis frame and formed on a window frame mounted on the chassis frame;
a pillar frame disposed in the at least one main opening of the window frame in up and down directions and configured to partition the main opening into a plurality of inspection openings; and
a first and a second cover mounting brackets fixed to upper and lower portions of the pillar frame, respectively, and configured to engage with an inspection cover.

3. The maintenance window structure of claim 2, wherein the first and the second cover mounting brackets detachably provide the pillar frame to the pillar mounting bracket.

4. The maintenance window structure of claim 3, further comprising a pillar mounting bracket that is fixed to the window frame and is configured to engage with the cover mounting bracket.

5. The maintenance window structure of claim 4, wherein the cover mounting bracket comprises:
a first mounting portion configured to engage with the pillar mounting bracket;
a flange portion that is bent, extended from the first mounting portion, and configured to support an edge of the inspection cover; and
a second mounting portion connected to the first mounting portion and configured to engage with an inner edge of the inspection cover.

6. The maintenance window structure of claim 5, further comprising:
a slit-shaped first bolt connection hole formed in the first mounting portion and joined with the pillar mounting bracket through a first mounting bolt.

7. The maintenance window structure of claim 5, wherein the pillar mounting bracket comprises a third mounting portion configured to engage with the first mounting portion through a first mounting bolt.

8. The maintenance window structure of claim 7, further comprising:
a pillar mounting bracket engage hole formed in the third mounting portion, wherein the first mounting bolt is inserted into the pillar mounting bracket engage hole; and
a pillar mounting bracket weld nut configured to engage with the first mounting bolt and fitted around the pillar mounting bracket engage hole.

9. The maintenance window structure of claim 5, wherein the flange portion comprises:
a first portion configured to support the upper and lower portions of the pillar frame; and
a second portion that is curved from the first portion and configured to support an inner surface of the window frame.

10. The maintenance window structure of claim 5, wherein the second mounting portion comprises: a support member disposed at a predetermined distance from the first mounting portion and configured to support an edge of the inspection cover.

11. The maintenance window structure of claim 10, wherein the support member comprises a bent portion connected to the first mounting portion.

12. The maintenance window structure of claim 10, further comprising:
a support engage hole formed in in the support member, wherein a second mounting bolt is inserted into the support engage hole; and
a support weld nut that is fitted around the support engage hole, and configured to engage with the second mounting bolt and secure the inspection cover.

13. The maintenance window structure of claim 12, further comprising: a second bolt connection hole formed in the first mounting portion and configured to engage the second mounting bolt that is inserted into the support engage hole.

14. The maintenance window structure of claim 2, wherein the pillar frame comprises: a first support bracket fixed on both sides of the pillar frame, and configured to support the cover mounting bracket and an edge of the inspection cover.

15. The maintenance window structure of claim 14, wherein the window frame comprises a second support bracket that is fixed to an inner surface of the window frame, and configured to support the cover mounting bracket and an edge of the inspection cover.

16. The maintenance window structure of claim 15, wherein the cover mounting bracket comprises a bracket support portion configured to support an inside edge of the inspection cover.

17. The maintenance window structure of claim 2, wherein the window frame comprises: an upper member; a lower member; a center member; and side members, and
the at least one main opening is divided by the center member.

18. The maintenance window structure of claim 2, wherein the window frame comprises a cover mounting portion provided at an edge of each main opening of the at least one main opening and configured to engage with an edge of the inspection cover.

* * * * *